United States Patent [19]
Kormendi

[11] 3,919,373
[45] Nov. 11, 1975

[54] METHOD OF MAKING A LIQUID CONTAINER FROM THERMOPLASTIC SYNTHETIC MATERIAL

[75] Inventor: Kalman Kormendi, Karlsruhe, Baden, Germany

[73] Assignee: ELBATAINER Kunststoff- und Verpackungs-Gesellschaft mbH & Co., Ettlingen, Germany

[22] Filed: Aug. 13, 1973

[21] Appl. No.: 387,853

Related U.S. Application Data

[63] Continuation of Ser. No. 72,389, Sept. 15, 1970, abandoned.

[30] Foreign Application Priority Data

Sept. 16, 1969 Germany............................ 1946737

[52] U.S. Cl. ...................... 264/89; 264/90; 264/98; 264/248; 264/278; 425/503; 425/DIG. 214
[51] Int. Cl.² ..................... B29C 17/07; B29D 3/02
[58] Field of Search ............ 264/89, 90, 92, 93, 94, 264/96, 97, 98, 99, 248, 249, 296, 259, 274, 275, 278, DIG. 78; 425/242 B, 324 B, 326 B, 387 B, DIG. 214, 503, 504

[56] References Cited
UNITED STATES PATENTS

| | | | |
|---|---|---|---|
| 3,358,062 | 12/1967 | Lemelson.......................... | 264/98 X |
| 3,424,623 | 1/1969 | Oakley et al...................... | 264/94 X |
| 3,655,849 | 4/1972 | Hayashi............................. | 264/98 |

*Primary Examiner*—Jan H. Silbaugh
*Attorney, Agent, or Firm*—Ernest G. Montague; Karl F. Ross; Herbert Dubno

[57] ABSTRACT

A closed liquid container of thermoplastic synthetic-resin material is formed by blowing and in the production of such containers the blowing method includes disposing at least one construction element by material deformation within the container wall for dividing the inner space of the container into sections, the element so disposed serving simultaneously as a reinforcement and an intermediate wall of the container.

6 Claims, 11 Drawing Figures

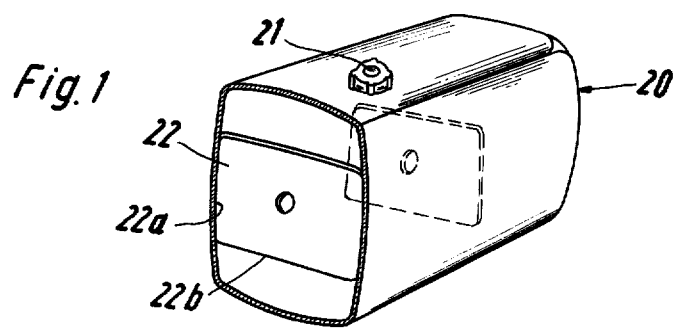
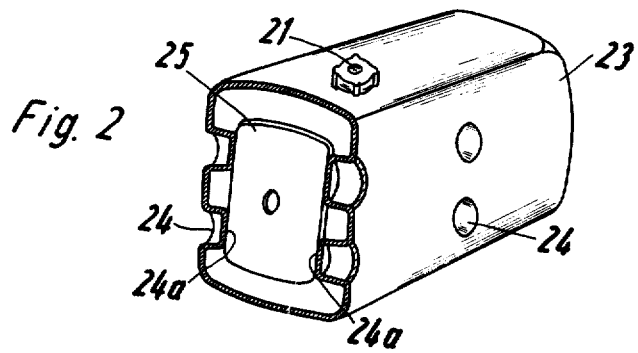
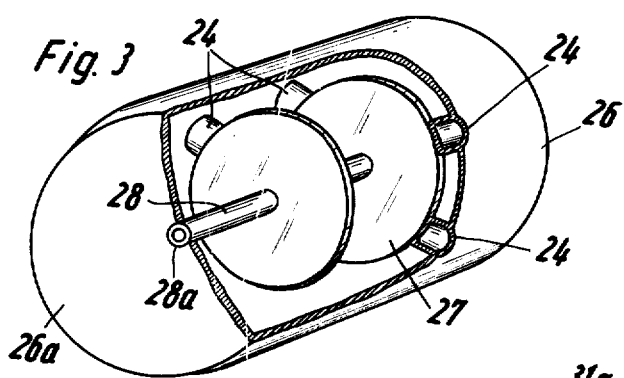
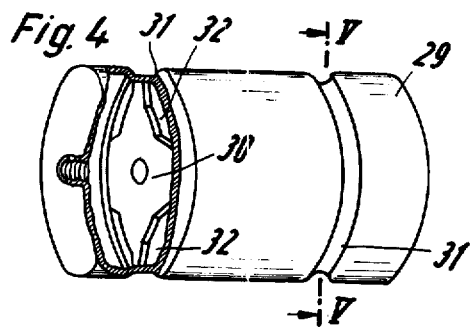
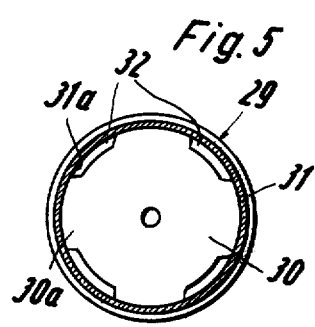

METHOD OF MAKING A LIQUID CONTAINER FROM THERMOPLASTIC SYNTHETIC MATERIAL

This application is a continuation of Ser. No. 72,389 filed Sept. 15, 1970, now abandoned.

The present invention relates to a method of producing closed liquid containers of a thermoplastic synthetic-resin material by a blowing process.

In relatively large liquid containers, such as fuel tanks, construction elements are required to be disposed therein whereby the containers are reinforced and the hydrodynamic forces of the moving liquid during transportation are at least partly intercepted and absorbed.

In known liquid vessels, these requirements are fulfilled now by the use of sheet metal containers with reinforcement ribs and metal sheets welded in the inner space or riveted therein. The production of such containers requires complicated processes for the mounting of the sheet metal parts and the subsequent liquid-tight closing of the containers, as well as appreciable material costs. Furthermore, the considerable weight of these known containers can be disturbing or even undesirable.

It is an object of the present invention to provide a method of producing a closed container in an economical manner and whereby a container so produced has sufficient static strength.

It is another object of the present invention to provide a closed liquid container, formed by the blowing process, with at least one construction element preferably at least partly made of a synthetic-resin material and secured to the container wall at least at some points and sectionally dividing the container innerspace.

Thus, as the container of synthetic-resin material is produced in liquid-tight form by the blowing process, a prefabricated construction element for reinforcing the container wall is secured in the container merely by material deformation so that this construction element serves simultaneously as a fortified or intermediate wall.

The construction element can be a reinforcement rib extending crosswise or lengthwise over a side wall or also over the entire container periphery, or an intermediate wall disposed to permit the passage of liquid or defining a liquid-tight compartment. Advantageously, the container has in its wall at the height of the construction element at least one indentation, on the wall face of which, turned toward the interior of the container, the construction element is seated at its outer edge. This indentation can extend bead-like over the entire container periphery and can surround the ring- or disc-shaped closed construction element with a seal which is either liquid-tight or capable of passing liquid. The liquid tightness is required if an intermediate wall serves as a separator between a plurality of adjacent compartments in a container, which may have in its outer wall a filling and discharge opening for each compartment. The liquid passage is permissible if the intermediate wall serves as a reinforcement wall for a single-compartment container.

Advantageously, the reinforcing insert is seated with only one or more sections of its periphery on one or more indentations formed in the container wall to define openings for the liquid passage between the reinforcing insert and the container wall. Preferably, the reinforcing insert is seated with its edge on at least two indentations, advantageously disposed opposite each other and peripherally spaced apart, thereby stabilizing the entire container and reducing its tendency to vibrate.

During use of a thermoplastic synthetic-resin material for the insert, either as a rib structure or as an intermediate wall, its sections are embedded in the material of the container wall and welded with the latter.

In case of a voluminous container with a large-area intermediate wall or insert, it may be necessary to stabilize the intermediate wall relative to the container wall. In this case the intermediate wall is braced with respect to the container wall in its longitudinal direction by at least one bracing element consisting of thermoplastic synthetic-resin material, for example a tube, rod or thread, of which at least an end section is welded into the wall of the container. For this purpose the intermediate wall can be pre-formed with the bracing element. If in a container a plurality of intermediate walls are used, the latter are advantageously also connected together by means of the bracing element, by pre-forming this assembly or by producing it integrally in one piece.

The liquid container can be produced particularly economically and the present invention can make use of a hose-shaped starting body (empty tubular parison) of a plastic, deformable synthetic-resin material which is shaped in a forming tool adapted to be opened and closed transversely to the parison-feed direction by impressing of a pressure medium. The construction element is inserted, as an independent part at the time the forming tool is open, into the parison up to a securing plane. Thereafter, but still prior to and/or during the closing of the forming tool, at least one section of its form wall at the securing plane presses the juxtaposed wall section of the parison against the outer edge of the insert and connects the insert to the parison wall. Only then is the parison, enclosed in the forming tool and still in a deformable state, brought into its final form by introduction of the pressure medium.

The method of the invention includes the step of employing a segment-shaped forming tool, movable by a driving device into an open or a closed position, and a tube-producing head of an extruder disposed thereabove. At the end of the forming tool, preferably in the head of the extruder, is disposed at least one holding mandrel movable in its axial direction with at least one receiving element for the insert to be lodged in the extruded tube or parison.

With this arrangement, an exact introduction of the construction element to the depth of the securing plane is obtained and such positioning of the insert can take place simultaneously with the introduction of the parison into the open forming tool. The holding mandrel holds the insert until the closing movement of the forming tool has pressed the wall section or sections of the parison disposed at the level of the insert against the outer edge of the insert and has connected the insert and parison wall together. Depending upon the shape of the holding mandrel, its enclosed section remains in the container after the blowing process and serves simultaneously as a bracing element or is removed from the container, whereupon the remaining opening is closed or is formed as a filling or a dispensing opening.

Advantageously, the forming tool has, in the plane at which the insert is to be anchored in the container, at least one holding claw extending at least temporarily inwardly out of the form wall. The face of the holding claw pointing towards a vertical center plane of the forming tool is formed with a profile at least partly embracing the outer edge of the insert. Preferably, the forming tool has at least two such holding claws, which are disposed diametrically opposite one another on opposite sides of the insert. Prior to the closing of the forming tool, the holding claws are urged towards one another, and grip the outer edge of the insert equally, pressing the wall sections of the parison against the insert and holding the latter tightly, whereupon the holding mandrel is immediately retracted and can be returned to its original position. The forming tool thus remains partly open for the duration of the retraction interval, so that the closing movement of the forming tool takes place in two steps. In the first step, the form halves of the forming tool are brought together only up to the diameter of the holding mandrel at the closing edges, while the holding claws projecting from the form wall press the walls of the hose-shaped parison against the edge of the insert and weld both together. Thereafter the holding claws remain engaged until the holding mandrel is moved out of the forming tool whereupon, in the second moving step, the forming tool is completely closed. For this purpose the holding claws are yieldably mounted in the wall of the forming tool, since they are urged back during the second moving step into the form wall. The holding claws can be under the pressure of springs in the direction towards the center of the forming tool.

If the insert serves as a protecting wall, it is of advantage to form the holding claws such that they project also from the form wall, when the forming tool is closed, and moved out, respectively. During the blowing process, the wall of the parison is stretched about the holding claws so that indentations are created in the container wall face of which, pointing towards the inner space of the container, the insert is seated with its outer edge. By using relatively narrow holding claws, stay-like indentations are thus formed, between which and about the insert substantially uniform passage openings extend to pass the liquid to be received by the container.

As further designed in accordance with the method of the present invention, the holding claws of a controllable driving device are at least movable partly independently of the closing movement of the forming tool in the direction to its vertical center plane. As a driving device, for example, electromagnets can be used to which a switch operable by a moved part is coordinated. Alternately, in devices wherein a forming tool is to be closed or opened pneumatically or hydraulically, each of the holding claws is operatively connected to one pressure cylinder in the pressure network with a piston pressing the holding claw under the influence of a pressure medium against the parison and the outer edge of the insert.

The closing movement of the forming tool is preferably initiated by a result-operated control, which can respond to operation of the holding mandrel, the holding claws or another device equipped, for example, with sensing elements.

These and other objects will become more readily apparent from the following description, reference being made to the accompanying drawing, in which:

FIG. 1 is a perspective view of a liquid container in cross-section in the shape of a parallelopipedon with an insert element serving as a protective wall in a first embodiment;

FIG. 2 is a perspective view of a liquid container in cross-section in the form of a parallelopipedon with an insert element serving as a protective wall in a second embodiment;

FIG. 3 is a perspective view of a partly broken away liquid container of a cylindrical form with an insert serving as a barrier in a third embodiment;

FIG. 4 is a perspective view of a partly broken away liquid container of cylindrical form with an insert serving as a sound barrier, in a fourth embodiment;

FIG. 5 is a section of the liquid container along the line V—V of FIG. 4;

Figure 6:
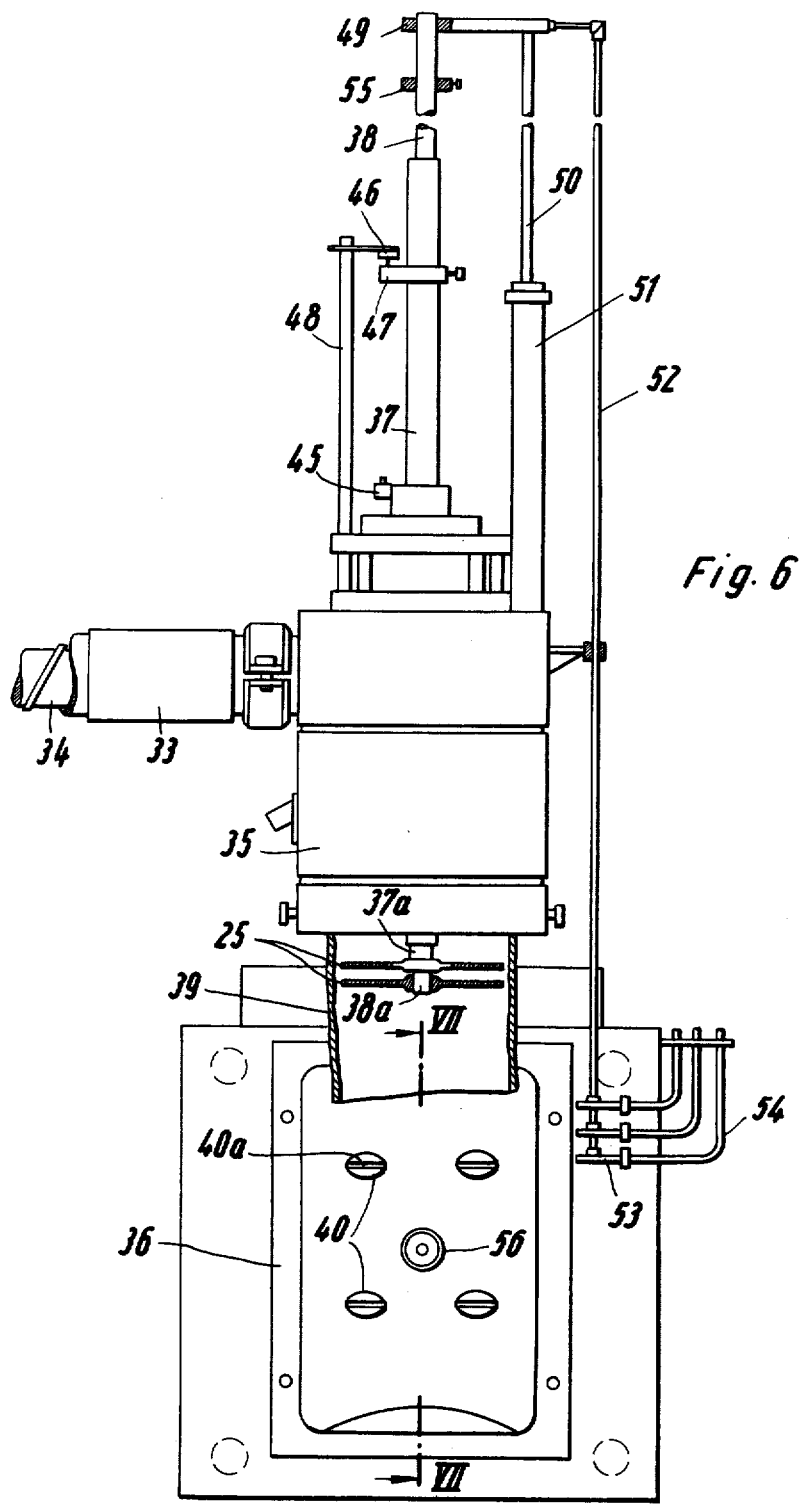
FIG. 6 is a side elevation of a broken away extruder showing its head and a form half of an opened forming tool in a first embodiment of the apparatus for carrying out the method of the present invention.

In FIG. 1 the liquid container, of a parallelopipedon shape, is formed by blowing a thermoplastic synthetic resin liquid tight and has in a side wall a filling and a discharge opening 21, which dependent upon its use is equipped with a closure or a suitable fitting. In its inner space, the liquid container has two inserts 22 disposed in spaced apart relation and designed as rectangular intermediate walls of a length corresponding with the width of the liquid container and a height less than the height of the container. The intermediate walls are fused only with their short edge faces 22a to oppositely disposed side walls of the container at about medium height. The spaces between the longitudinal edges 22b and the container wall serve as liquid passages.

The liquid container 23, likewise of parallelopipedon shape, shown in FIG. 2, has at two oppositely disposed side walls four indentations 24 which are uniformly pressed inwardly from the container wall and are arranged in pairs opposite each other. The indentations 24 project in the manner of small stays into the inner space of the container and carry on their ends 24a turned towards the inner space, two transverse rectangular intermediate walls 25 spaced apart from each other, the intermediate walls 25 being appreciably smaller in length as well as in width than the cross-section of the hollow space of the container. The intermediate walls sit embedded with the corresponding section of their vertical edge faces in a hollow profile of the indentation end surfaces 24a and are in addition welded to the latter. The stay-like indentations 24 secure the intermediate walls, and define simultaneously a permanent distance between the edge of the intermediate wall and the container wall for the formation of the passages already mentioned in connection with FIG. 1 for the liquids to be received by the container.

Thus the intermediate walls serve as protective walls as well as for the stabilization of the container wall.

The disc-like intermediate walls 27 disposed in FIG. 3 in a cylindrical liquid container 26, in the previously described manner, perform the same tasks. As in the embodiment shown in FIGS. 1 and 2, the intermediate walls sit with their edge on the stay-like indentations 24. The intermediate walls with the container are braced in the longitudinal direction by a tube 28 made likewise of a thermoplastic synthetic material which is rigidly connected with both intermediate walls along the longitudinal axis of the container and is welded with a free end section 28a in one of the end walls 26a of the container. The tube end section 28a projects out of the container wall 26a and is closable from the outside by known means. The tube 28 itself reaches in the inner space of the container with its other non-secured end section up onto the second container end wall and serves during the discharge of the container in its upright position as a suction tube. Instead of the tube 28, the intermediate walls 27 can be braced also with a rod or with a comparatively strong thread, preferably of synthetic material, the filling and discharging opening being disposed at another suitable location.

FIGS. 4 and 5 show likewise a cylindrical liquid container 29 with two transverse intermediate walls spaced apart from each other and secured with an annularly closed indentation 31 in the container periphery. The intermediate walls 30 are discs with a diameter slightly smaller than the inner diameter of the container. These discs serve also in this embodiment as protecting walls and have as liquid passage openings at the edge four recesses 32 uniformly distributed over the periphery.

Figure 7:
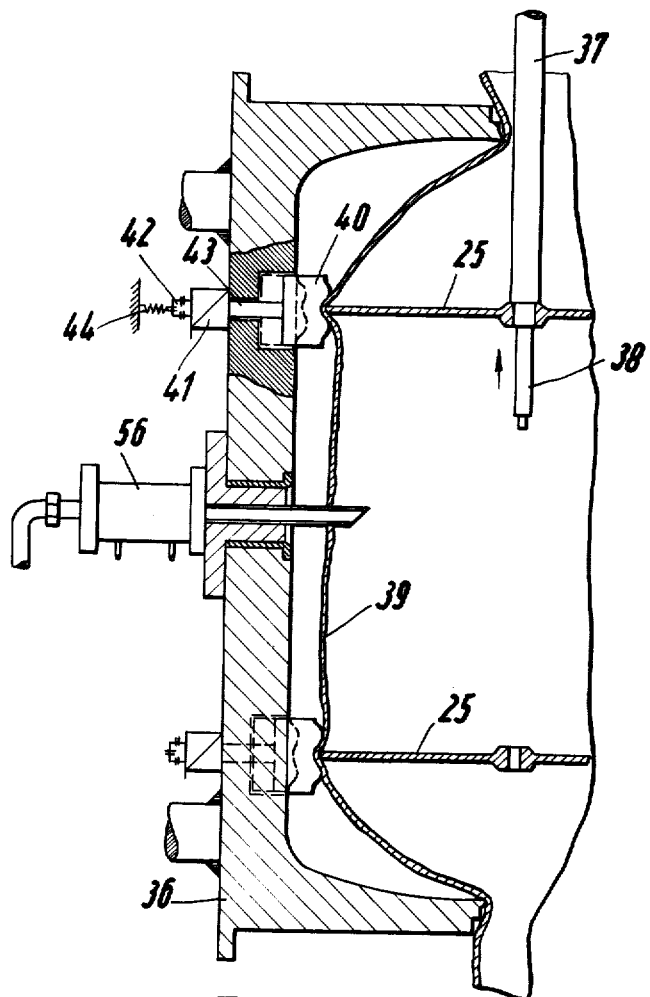
FIG. 7 is a section of the form half of FIG. 6 partly closed and taken along the line VII—VII of FIG. 6, in an enlarged scale, and partly broken away to show a holding claw and two intermediate walls inserted into the synthetic-material parison.

FIGS. 6 and 7 show an apparatus for the production of the liquid container 23 in accordance with FIG. 2. From a known extruder, only a portion of the starting member of the pressure cylinder 33 with the worm 34 is shown, connected with a parison-producing head 35, which is disposed above a forming tool shown only with one form half 36. This forming tool is divided into two form halves, which are movable transversely to the feeding direction of the synthetic-resin parison into an open or a closed position. The parison-forming head 35 is equipped with a known and for this reason not shown device for the opening and the closing of the annular parison-discharge opening. A two-part holding mandrel, disposed in the center relative to the parison-discharged opening and telescopically movable in axial direction out of the head, is mounted in the latter. This holding mandrel comprises a tube 37 extending perpendicularly through the head 35 and a round rod 38, which both have on their end sections turned towards the forming tool, known receiving elements 37a and 38a with spring claws for an easy releasable mounting of an intermediate wall or insert 38. The holding mandrel is shown in FIG. 6 in its rest position above the forming tool. Two intermediate walls 25 are mounted on the receiving elements 37a and 38a, which intermediate walls 25 are disposed in the lower section of a parison 39 of synthetic material emerging from the parison-forming head tightly thereunder. The intermediate walls are peripherally smaller than the parison, so that they do not engage during exact longitudinal feeding.

In the wall of the forming tool 36 there are mounted, in suitable recesses, eight holding claws 40 in two transverse planes and disposed opposite each other in pairs. The holding claws are movable independently from the closing movement of the forming tool, transversely to its perpendicular center plane. With each of the holding claws there is coordinated an electromagnet 41 rigidly disposed on the forming tool, the movable core 42 of the magnet 41 being connected with the holding claw by means of a bolt 43 guided in the forming-tool wall. A spring 44 tends to maintain the holding claw in a rest position withdrawn into the forming-tool wall, in which the magnet core 42 is outside of the magnet winding.

In the electric circuit of the electromagnets 41 are disposed two limit switches 45 and 46, which are spaced apart from each other within the moving range of a switching member 47 which is adjustable in its position on the outer tubular part 37 of the holding mandrel. One limit switch 45 sits directly on the parison-forming head at the upper end of the guide for the holding mandrel, while the second limit switch 46 is secured at a suitable distance above the first in a holder 48. The switch spacing corresponds to the movement path of the upper intermediate wall 25 from the rest position shown in FIG. 6 up into the upper transverse plane, in which the upper holding claws 40 are mounted in the form halves. The inner part 38, coaxially guided in the tubular holding mandrel part 37, projects downwardly only with the receiving element for the lower intermediate wall, but upwardly with appreciable length out of the tubular-shaped holding mandrel part and is connected with the end section on this side by means of a cross-bar 49 with the piston rod 50 of a control cylinder 51 operatively disposed in a hydraulic system. On the cross-bar 49 there is provided a transmission rod 52, which extends outside of the apparatus parallel to the holding mandrel and carries over the region of the forming tool 36 three photocells 53 disposed tightly one below the other, which three photocells 53 are connected by electical cables 54 to a control device for the hydraulic system with its hydraulic pump.

The operation of the apparatus in accordance with FIGS. 6 and 7 is as follows:

Intermediate walls 25, of weldable synthetic material, are mounted on the receiving elements 37a and 38a of the two parts 37 of the holding mandrel 37 and 38. A parison section 39 consisting of a formable synthetic material is extruded from the parison-forming head 35, which parison 39 first receives the intermediate walls 25 in its hollow space and then enters into the opened forming tool 36. When the lower edge of the parison is at the level of the sensing photocells 53, the latter emit their control impulse to the hydraulic pump (not shown), the oil pressure of which moves the inner part 38 of the holding mandrel downwardly via the control cylinder 51, the piston rod 50 and the cross-bar 49 of the inner part 38 of the holding mandrel, the lower section of which part 38 thus projects downwardly telescopically from the outer tubular holding mandrel part 37 and introduces the lower intermediate wall or insert into the open forming tool. The photocells 53 connected by means of the transmission rod 52 with this part 38 of the holding mandrel join the perpendicular feeding movement and control its speed by the sensing of the lower parison edge, so that its movement relative to each other is performed synchronously. As soon as the lower intermediate wall 25 with the inner part 38 of the holding mandrel is at a distance from the resting upper intermediate wall 25 corresponding to the distance of the two horizontal securing planes formed by the holding claws 40, a setting ring 55 adjustably secured on the part 37 of the holding mandrel abuts the upper end face of the outer tubular part 37 of the holding mandrel and joins the latter during the continued vertical movement. At the moment of the entrance of both intermediate walls 25 into their securing planes between the holding claws 40, the switching member 47, secured to the outer part 37 of the holding mandrel, engages the lower end switch 45, which interrupts the feeding movement of the parison and the holding mandrel and initiates the feeding movement of the forming tool. At first the form halves are brought only partly together by the hydraulic system (not shown) so that the holding mandrel between the upper closing edge of the forming tool still has room for moving out from the forming tool. In this position, shown in FIG. 7, the form halves trigger the electromagnets 41, so that their coils are excited and the magnet cores 42 are pulled. By this arrangement the holding claws 40 puxh inwardly toward the vertical center plane of the forming tool from their form walls and press with their groove-like profiled inner faces, the still heated parison wall against the edges of the intermediate walls 25, in order to weld both together. In this position the holding claws 40 operate switches (not shown), which in turn switch the hydraulic system on again, the control cylinder 51 of which moves back the parts of the holding mandrel from the receiving bores of the intermediate walls and from the forming tool, upwardly into the rest position shown in FIG. 8. Here the switching member 47 of the holding mandrel operates the second, upper end switch 46, which starts the final closing of the forming tool and renders the electromagents 41 without current. Thereafter, air is blown into the parison by means of a laterally disposed blowing pin 56, whereby its wall is stretched to conform to the inner configuration of the forming tool and into the final container form.

In the rapidly succeeding working movements of the apparatus parts in a series fabrication, the intermediate wall can tip or even fall off. In order to avoid this, a control device with impulse generators cooperates with the holding claws 40 and are connected with the driving device for the forming tool and the closing movement of which is released only after operation of the holding claws, and in particular only if their working movement is limited by an abutment against the edge of the intermediate wall. Since the forming tool is driven preferably hydraulically, the pressure cylinders 59 of the holding claws are switched in the embodiment of FIG. 8 for the sake of simplicity into the pressure conduit system of the driving apparatus operating the forming tool. Each of the pressure cylinders has during the working movement of the piston 58, limited by the edge of the disc-like intermediate wall 27, a pressure medium discharge opening 61 covered by the piston 58, which opening 61 is freed by the piston only upon surpassing the limit of the working movement in the direction towards the vertical forming-tool center plane for a pressure medium exit.

Figure 8:
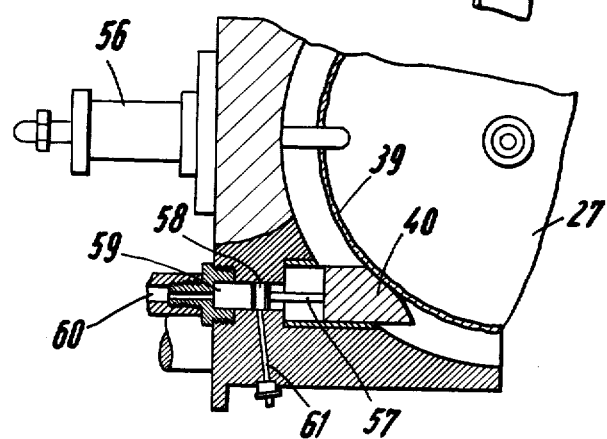
FIG. 8 is a fragmentary section of a form half of the forming tool of a second embodiment of the apparatus.

Thus in the embodiment disclosed in FIG. 8, if an intermediate wall 27 is not arranged in the securing plane, at least one of the holding claws pushes into the open during its working movement beyond the otherwise limited position by the intermediate wall and its driving piston frees thereby the pressure medium discharge opening extending from its pressure cylinder, through which now the pressure medium can flow off into a pressure-free container. Accordingly, in the pressure conduit system, the pressure is reduced and can no longer suffice for a switching impulse for closing of the forming tool. By this arrangement the continued operation of the apparatus is interrupted and can be put into operation again only after the position of the tipped off intermediate wall is corrected. By this arrangement, too, it is assured that the preliminary container bodies are formed only when the inserts are in a correct position.

This safety problem could be solved also differently, for example, by electrical means.

Figure 9:
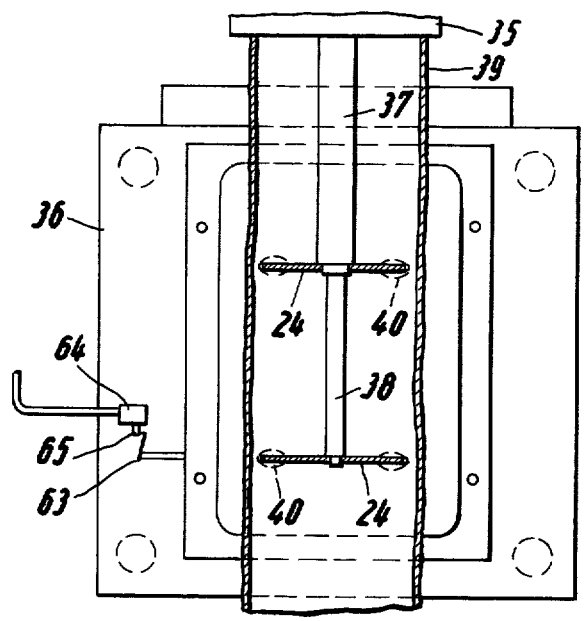
FIG. 9 is a partial view of the apparatus of FIG. 6, partly in section and showing a control device.

In FIG. 9 another embodiment of a control device for the apparatus of FIGS. 6 and 7 is shown. In accordance with this embodiment, a switch bow 63 with a comparably short run-up face and an electric key switch 64 cooperates with the holding claws 40. All switches are disposed in series in the current circuit for the driving device for the closing movement of the forming tool. The pressure key 65 of each switch is set in the swinging range of the switch bow 63 thereof, so that the latter stands only in case of a correct engagement of the holding claw 40 on the intermediate wall edge at the level of the pressure key run up on a short bow face, and secures the pressure key pressed in its switching position. In front of, as well as behind this position, the switch is in an inoperative position, so that from the entire arrangement it results that, upon pressing of all holding claws on the intermediate wall edge, and totally operated key advances the current impulse for the closing movement of the forming tool. If, however, at least one holding claw has not come into engagement against the intermediate wall edge and moves beyond this position, the corresponding switch bow is moved beyond the switching position, whereupon the current circuit and, thereby, the closing movement of the forming tool is again interrupted.

Figure 10:
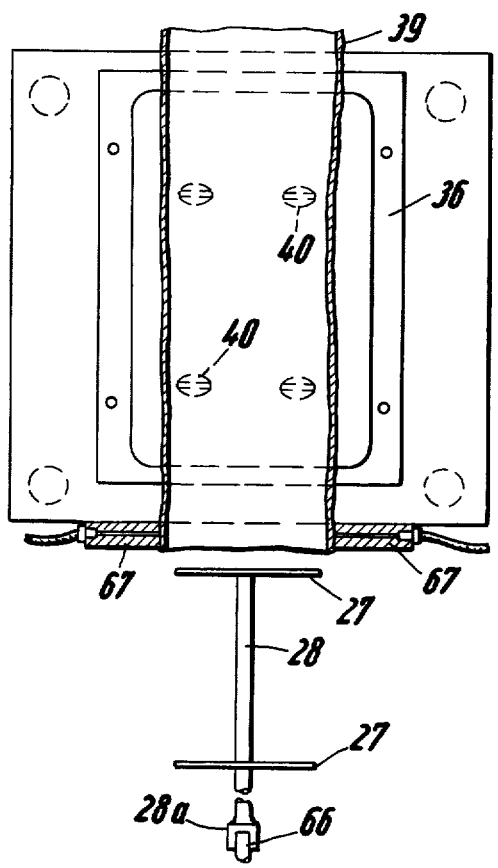
FIG. 10 is a fragmentary view of the apparatus of FIG. 6 illustrating a third embodiment.

FIG. 10 shows an apparatus for the production of a liquid container as indicated in FIG. 3. In this apparatus, the intermediate walls 27 are pre-mounted in a tube 28 of thermoplastic synthetic material at a distance adjusted to the distance of the holding claws 40 and welded together with the latter. The tube sits in centrally disposed bores of the intermediate walls. It extends from the upper intermediate wall on one side downwardly, at right angles to the intermediate walls through the lower intermediate wall and is mounted on a vertically movable holding mandrel 66 below the forming tool 36. On the lower side, thus pointing towards the mentioned holding mandrel, vacuum claws 67 are carried by the forming tool, which have the task, after introduction of the parison 39 of synthetic material, to secure the lower edge disposed between the vacuum claws by engagement of a vacuum widely open, as long as the holding mandrel 66 slides in the synthetic material tube with the intermediate walls 27 from below into the parison. Upon reaching the position in which the intermediate walls 27 stay at the level of the holding claws 40, the working processes take place for the securing of the intermediate walls, as well as for the closing of the forming tool and for the final formation of the container substantially such as it has been described in connection with FIGS. 6 to 9. On the other hand, in the present instance, the apparatus can be made simpler since the tube 28 of synthetic material is enclosed with the intermediate walls 27 jointly in the container and embedded and welded with its free end section during the closing movement of the forming tool between the lower closing edges in the wall of the parison of synthetic material. Depending upon how the intermediate walls are to be secured to the container wall, either the holding claws 40 projecting from the form wall can be disposed rigidly, or they can be disposed of entirely, because the intermediate walls are secured by the tube 28 and the form halves of the forming tool 36 are suitably completely closed in one step.

Figure 11:
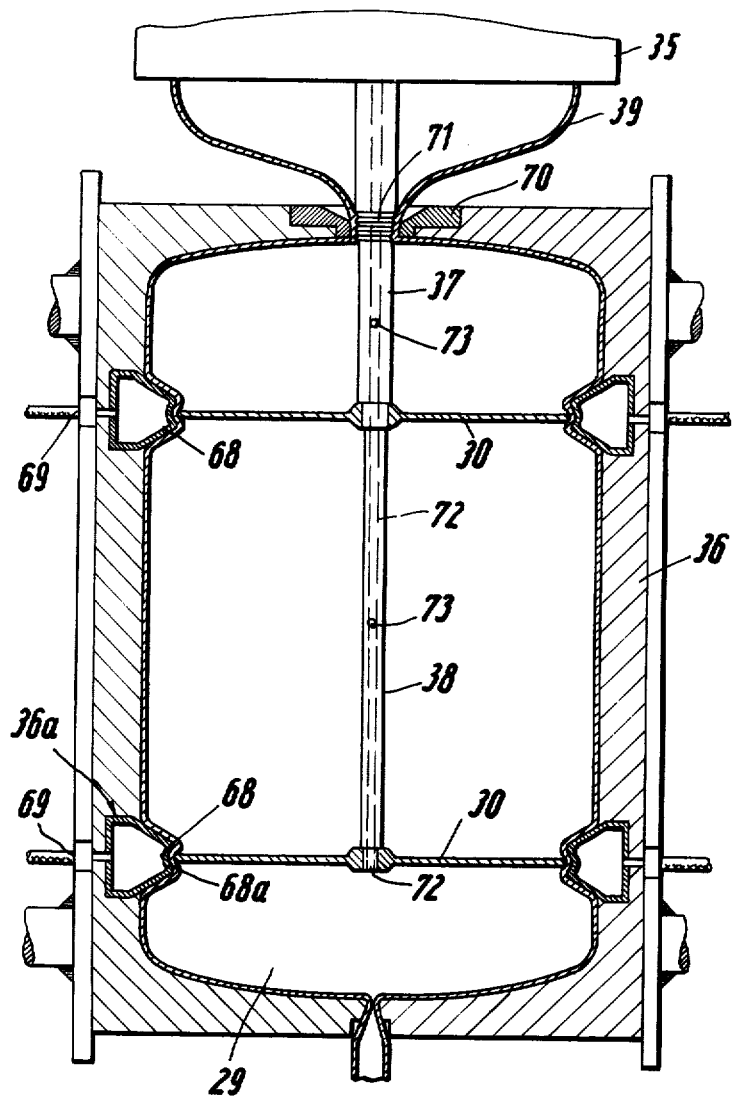
FIG. 11 is a cross-section through a forming tool constituting a fourth embodiment of the apparatus.

In FIG. 11 I show an apparatus for the production of the liquid container 29 of FIGS. 4 and 5. The form halves of the forming tool have semi-cylindrical hollow chambers adjusted relative to each other with two half-circular shaped grooves 36a, in which grooves 36a respective hollow holding claws 68 of elastic material are disposed, on which two claws form a closed forming tool in annular form. They have on the inside a profile 68a adjusted to the intermediate wall edge and on the outside a connection 69 to a pneumatic system, which, as already mentioned before, is known per se and for this reason is not shown in detail. In the center of the upper closing edges, calibration claws 70 are inserted which are adjusted to a section of the holding mandrel equipped with an outer thread 71. The intermediate walls 30 are, as already described in connection with FIGS. 4 and 5, discs with a diameter which corresponds with the inner diameter of the annularly closed holding claws 68 subjected to pressure, and have at the edge wall sections 30a on the periphery, uniformly divided end recesses 32. They are inserted, the same as in the devices shown in FIGS. 6, 7 and 9, with a holding mandrel 37 and 38 rollable telescopically into the forming tool from the parison-forming head 35. The switch member 47, shown in FIG. 6, of the holding mandrel immediately switches thereby, however, upon reaching the switch 45, closing the forming tool in one step. The hollow holding claws thereby stand under slight vacuum pressure with a profile 68a pulled into the grooves 36a. During the blowing process, the air pressure reaches likewise the holding claws, which thereupon inflate and surround the intermediate walls 30 rigidly with their profile 68a, in order to embed their wall sections 30a into the parison wall and to weld both together. The blowing air for stretching of the parison derives from a bore 72 passing longitudinally through the holding mandrel and lateral discharge openings 73 into the inner space of the parison which thereby obtains the form or shape shown in FIG. 4. Only thereafter is the holding mandrel 37 and 38 withdrawn from the forming tool, the holding mandrel being moved rotatably, however, at the start of the upward movement additionally about its longitudinal axis in order to leave a container opening equipped with an inner thread with the threaded section 71, which container opening can be closed with a screw closure.

I claim:

1. A method of producing a closed liquid container of thermoplastic synthetic material, comprising the steps of
   feeding a hollow empty plastic ally deformable and expandable synthetic material parison in a forming tool having mold halves openable and closable relative to each other transversely to the direction of feeding of said parison into said forming tool,
   introducing at least one planar insert having an outer peripheral edge and constituting an independent part into said parison with substantial empty space on each side thereof, aligned in a plane perpendicular to a longitudinal axis of said parison and with said edge spaced from the walls of said parison, and during the open state of said mold halves of said forming tool,
   pressing and connecting together said edge of said insert with a section of said walls of said parison aligned in said plane, prior to closing of said mold halves of said forming tool, by at least one forming tool section acting independently of the closing of said mold halves and disposed in said plane, by pressing said section of said walls of said parison against said edge of said insert to stabilize said walls, and only thereafter,
   closing said mold halves, and
   feeding a pressure medium into said parison enclosed in said forming tool while said parison is still a deformable state to impart a final shape to said parison.

2. The method as set forth in claim 1 wherein predetermined wall sections of said parison are pressed against the outer edge of said insert after entrance of said insert into the securing plane.

3. The method as set forth in claim 2, further comprising the steps of retaining said insert in said securing plane up to the pressing and connecting engagement.

4. The method as set forth in claim 3, which includes the steps of employing a holding mandrel to position said insert and calibrating the opening left in said parison wall by said holding mandrel during withdrawal of said holding mandrel through said opening after said blowing procedure.

5. The method as set forth in claim 3 wherein said step of introducing said insert is performed synchronously with the insertion movement of said parison in said tool.

6. The method as set forth in claim 1, which includes the steps of inserting first only said parison into the opened forming tool, maintaining open at least one end of the parison through which the insert is introduced by vacuum applied thereto, introducing thereafter said insert, and closing said forming tool.

* * * * *